US007514600B2

(12) United States Patent
Paknikar

(10) Patent No.: US 7,514,600 B2
(45) Date of Patent: Apr. 7, 2009

(54) STABILIZING SOLUTIONS FOR SUBMICRONIC PARTICLES, METHODS FOR MAKING THE SAME AND METHODS OF STABILIZING SUBMICRONIC PARTICLES

(75) Inventor: Kishore Madhukar Paknikar, Pune (IN)

(73) Assignee: Nano Cutting Edge Technologies PVT, Ltd., Mumbai (IN)

( * ) Notice: Subject to any disclaimer, the term of this patent is extended or adjusted under 35 U.S.C. 154(b) by 0 days.

(21) Appl. No.: 11/547,887

(22) PCT Filed: May 11, 2005

(86) PCT No.: PCT/IN2005/000153

§ 371 (c)(1), (2), (4) Date: Oct. 5, 2006

(87) PCT Pub. No.: WO2006/001033

PCT Pub. Date: Jan. 5, 2006

(65) Prior Publication Data

US 2007/0269880 A1 Nov. 22, 2007

(30) Foreign Application Priority Data

May 12, 2004 (IN) ........................ 550/MUM/2004

(51) Int. Cl.
*A01H 9/00* (2006.01)
*C12N 1/00* (2006.01)
*C12N 5/00* (2006.01)

(52) U.S. Cl. .................... 800/295; 435/243; 435/317.1; 435/325

(58) Field of Classification Search ................. 800/295; 435/243, 317.1, 325
See application file for complete search history.

(56) References Cited

U.S. PATENT DOCUMENTS

| | | | |
|---|---|---|---|
| 185,889 | A | 1/1877 | Boorman |
| 6,660,058 | B1 | 12/2003 | Oh |

FOREIGN PATENT DOCUMENTS

| | | | |
|---|---|---|---|
| AU | 2003225460 A1 | 10/2003 | |
| WO | WO 03/080231 A1 | 10/2003 | |

OTHER PUBLICATIONS

Chakrabortty et al (Phytotherapy Research vol. 3, No. 1, pp. 30-32, 1989).*
Shukla et al (Geobios (Jodhpur) vol. 24, No. 1, pp. 35-39, 1997).*

* cited by examiner

*Primary Examiner*—Mark Navarro
(74) *Attorney, Agent, or Firm*—Charles A. Muserlian

(57) ABSTRACT

Stabilizing solutions for submicronic particles, methods for making the same and methods of stabilizing submicronic particles is disclosed.

7 Claims, 5 Drawing Sheets

STABILIZING SOLUTIONS FOR SUBMICRONIC PARTICLES, METHODS FOR MAKING THE SAME AND METHODS OF STABILIZING SUBMICRONIC PARTICLES

This application is a 371 of PCT/IN2005/000,153 filed May 11, 2005.

FIELD OF THE INVENTION

This invention relates to nano submicronic particles and particularly, it relates to a stabilizing solution for submicronic particles, methods for making these stabilizing solutions and methods of stabilizing submicronic particles to form stable nano submicronic particles.

BACKGROUND OF THE INVENTION

Submicronic particles are particles less than 1 micron and include nano scale particles. Nano particles are part of an emerging science called 'nano technology'. The word nano technology comes from the Greek prefix 'nano' meaning "one billionth". In modern scientific parlance, a nanometer is one billionth of a meter, about the length often hydrogen atoms placed side by side in a line. The smallest things that an unaided human eye can see are 10,000 nanometers across. Nano particles are typically and generally spherical in shape.

Nanoscience, simply, is the study of the fundamental principles of structures with at least one dimension roughly between 1 and 100 nanometers and Nanotechnology is the application of these nanostructures into useful nanoscale devices.

Nano scale particles of substances exhibit properties unlike the properties of their macro counterparts often with stunning new results. Nano scale is unique because it is the size scale where the familiar day-to-day properties of materials like conductivity, hardness or melting point meet the more exotic properties of the atomic and molecular world such as wave-particle duality and quantum effects. At the nano scale, the most fundamental properties of the materials and machines depend on their size in a way they don't at any other scale. For e.g. a nano scale wire or circuit component does not necessarily obey Ohm's law. Nano-scale particles have unique physical properties (e.g. optical, dielectric, magnetic, mechanical), transport properties (e.g., thermal, atomic diffusion) and processing characteristics (e.g., faster sintering kinetics, super-plastic forming).

Physicist Richard Feynman first described the possibility of molecular engineering. In 1959 Feynman gave a lecture at the California Institute of Technology called "There's Plenty of Room at the Bottom" where he observed that the principles of physics do not deny the possibility of manipulating things atom by atom. He suggested using small machines to make even tinier machines, and so on down to the atomic level itself. Nano technology as it is understood now though, is the brainchild of Feynman's one-time student K. Eric Drexler. Drexler presented his key ideas in a paper on molecular engineering published in 1981, and expanded these in his books Engines of Creation and Nano systems: Molecular Machinery, Manufacturing and Computation, which describes the principles and mechanisms of molecular nano technology.

In 1981 the invention of the Scanning Tunneling Microscope or STM, by Gerd Binnig and Heinrich Rohrer at IBM's Zurich Research Labs, and the Atomic Force Microscope (AFM) five years later, made it possible to not only take photos of individual atoms, but to actual move a single atom around. Soon after, John Foster of IBM Almaden labs was able to spell "IBM" out of 35 xenon atoms on a nickel surface, using a scanning tunneling microscope to push the atoms into place.

A nanometer is a magical point on the dimensional scale. Nano structures are at the confluence of the smallest of Human-made devices and the largest molecules of the living things. Nano technology exploits the new physical, chemical and biological properties of systems that are intermediate in size, between isolated atoms/molecules and bulk materials, where the transitional properties between the two limits can be controlled.

The synthesis and characterization of nano particles has received attention in recent years because of the possibility of their widespread use in industry and chemistry. Nanotechnology is gaining importance in areas such as biomedical sciences, optics, electronics, magnetics, mechanics, ceramics, catalysis and energy science. However, the preparation of such nano structured materials poses several unique challenges. A range of nano particles has been produced by physical, chemical and biological methods.

Two approaches have been adopted for nano fabrication—The Top down processes, which include the methods of synthesis that carve out or add aggregates of molecules to a surface. The second is the bottom up approach, which assembles atoms or molecules into nano structures.

PHYSICAL methods include Electron beam lithography, Scanning probe method, Soft lithography, Microcontact printing, Micromoulding.

In Electron Beam Lithography, an electron beam scans the surface of a semiconductor containing a buried layer of quantum well material. The resist gets removed where the beam has drawn a pattern.

Soft lithography is an extension of the previous technique and overcomes the impracticability of applying electron beam lithography to large scale manufacturing by making a mould or a stamp, which can be used repeatedly to produce nanostructures. In Micro contact printing, the PDMS stamp is inked with a solution consisting of organic molecules called thiols and then pressed against a thin film of gold on a silicon plate. The thiols form a self-assembled monolayer on the gold surface that reproduces the stamp pattern; features in the pattern can be as small as 50 nm. In Micromoulding, the PDMS stamp is placed on a hard surface, and a liquid polymer flows into the recesses between the surface and the stamp. The polymer solidifies into the desired pattern, which may contain features smaller than 10 nm.

Scanning probe microscope can image the surface of conducting materials with atomic scale detail. Hence single atoms can be placed at selected positions and structures can be built to a particular pattern atom by atom. It can also be used to make scratches on a surface and if the current flowing from the tip of the STM is increased the microscope becomes a very small source for an electron beam which can be used to write nanometer scale patterns. The STM tip can also push individual atoms around on a surface to build rings and wires that are only one atom wide.

In Sonochemical method, an acoustic cavitation process is used to generate a transient localized hot zone with extremely high temperature gradient and pressure (Suslick et al. 1996). Such sudden changes in temperature and pressure bring about the destruction of the sonochemical precursor (e.g., organometallic solution) and the formation of nanoparticles.

Hydrodynamic cavitation consists of synthesis of Nanoparticles by creation and release of gas bubbles inside sol-gel solutions (Sunstrom et al. 1996).

High energy ball milling is already a commercial technology, but has been considered dirty because of contamination problems from ball-milling processes. However, the availability of tungsten carbide components and the use of inert atmosphere and/or high vacuum processes have reduced impurities to acceptable levels for many industrial applications. Common drawbacks include the low surface area, the highly polydisperse size distributions, and the partially amorphous state of the as prepared powders.

CHEMICAL methods include Wet chemical preparation, Surface passivation, Core shell synthesis, Organometallic precursor, Sol gel method, Langmuir-Blodgett method, Precipitation in structured media, Zeolites, Micelles and inverse micelles formation.

A number of chemical strategies are now available for the construction of higher order structures. Organic molecules can be linked together by molecular recognition. For example, synergistic noncovalent donor acceptor interactions can give rise to intertwined rings (catenanes). Liquid crystal polymers having self-organized structures can be formed from organic molecules containing head groups capable of complementary hydrogen bonding interactions. Organic molecules can be assembled around metal ions such as Cu(I) that provide stereo chemical constricts in the construction of double helices. The synthesis of inorganic clusters, by contrast, is usually dependent on passivating the surface of a growing aggregate by capping the surface sites with stabilizing ligands.

Wet Chemical Preparation method involves the reaction between a metal ion and the desired anion under controlled conditions to generate nanocrystals of desired size.

BIOLOGICAL methods include Biomineralization using Bacteria, Yeast, Fungi, Plants and Biotemplating using Ferritin, Lumazine synthase, Virus Surface layers DNA etc.

A few attempts have been made to synthesize sulfides, typically cadmium sulfide (CdS) using microorganisms. It was shown that CdS nanoparticles can be synthesized in the yeasts *Candida glabrata* and *Schizosaccharomyces pombe*. These nanoparticles are coated with short peptides known as phytochelatins, which have the general structure (y-Glu-Cys) n-Gly where n varies from 2-6. The nanoparticles are size reproducible, more monodisperse, and have greater stability than synthetically produced nanoparticles. Further work on microbial synthesis of CdS nanoparticles is scant and is limited to studies on characterization and efficient production in batch cultivation.

U.S. Pat. Nos. 5,876,480 & 6,054,495 describe a process for creating unagglomerated metal nano-particles, comprising the steps of (a) forming a dispersion in an aqueous or polar solvent, the dispersion including unpolymerized lipid vesicles, the unpolymerized lipid vesicles each comprising at least one lipid bilayer, the lipid bilayer including a negatively charged lipid that has an anionic binding group, and the lipid vesicles having catalytic first metal ions bound thereto by ionic bonding, (b) combining the dispersion of step (a) with a metallization bath containing free second metal ions to form a mixture, and (c) incubating the mixture of step (b) at a temperature sufficient to reduce said free second metal ions and to form unagglomerated metal nano-particles having an average diameter between about 1-100 nm.

U.S. Pat. No. 6,068,800 describes a process and apparatus for producing nano-scale particles using the interaction between a laser beam and a liquid precursor solution using either a solid substrate or a plasma during the laser-liquid interaction.

U.S. Pat. Nos. 5,618,475 and 5,665,277 relate to production of particulates having nanoparticle dimensions, such as about 100 nanometers diameter or less, and, more particularly, to apparatus and method for producing nanoparticles of metals, alloys, intermetallics, ceramics, and other materials by quench condensation of a high temperature vapor generated by an evaporator having features effective to isolate evaporation conditions from downstream conditions and to concurrently evaporate materials of dissimilar vapor pressures.

U.S. Pat. No. 5,736,073 describes a process of production of nanometer particles by directed vapor deposition of electron beam evaporant onto a substrate.

U.S. Pat. No. 6,706,902 The continuous process according to the invention includes impregnating support materials and, after thermal activation, drying the support materials by spraying or by fluidized bed technology leads to form precious metal-containing support compositions that are active in the catalysis of oxidation reactions.

U.S. Pat. No. 6,562,403 is broadly concerned with chemical methods of forming ligated nanoparticle colloidal dispersions and recovered ligated nanoparticles which may be in superlattice form.

U.S. Pat. No. 5,698,483 A process for producing nano size powders comprising the steps of mixing an aqueous continuous phase comprising at least one metal cation salt with a hydrophilic organic polymeric disperse phase, forming a metal cation salt/polymer gel, and heat treating the gel at a temperature sufficient to drive off water and organics within the gel, leaving as a residue a nanometer particle-size powder.

The main disadvantages of these methods are that they are expensive and technically difficult and too slow for mass production. Most of the techniques are also capital intensive as well as inefficient in materials and energy use. The known methods are difficult to control in order to acquire a desired size and shape of the nano-scale particles to be produced. Many of these synthesis techniques also require the use of a vacuum unit and involve environmental concerns about chemical waste disposal. Almost all of the methods used in the manufacture of submicronic scale particles use at least one toxic or questionable chemical reagent at any of the three main components of synthesis which are solvent medium used in the synthesis, the reducing agent used in the synthesis and the material used for stabilization. Most of the reported methods rely heavily on the use organic solvents. Particles made with the help of these solvents are not biocompatible and therefore unsuitable for use in biological applications such as biosensors and markers. Many of the reducing agents such the borohydrides, dimethylformamide, hydrazines are very highly reactive chemicals and are hazardous both environmentally and biologically. In some cases isolation and recovery of the particles is difficult for example in the case of surfactants which have an affinity for carbon dioxide. The most significant set of problems arise however in the step of stabilization. Almost all the stabilizing or capping agents used in the form of polymers or chemicals pose hazardous and risky steps either in the final stabilized product or in the process of making the stabilizing substance or in the process of stabilization.

Physical and chemical methods in the manufacture of nanoparticles involve controlling crystallite size by restraining the reaction environment. However, problems occur with general instability of the product and in achieving monodisperse size. The dispersion of nano particles usually display very intense color due to plasmon resonance absorption, which can be attributed to the collective oscillation of conduction electrons, induced by the presence of an electromagnetic field.

Other problem areas in the above mentioned methods are uniform distribution of particles, morphology and crystallinity, particle agglomeration during and after synthesis and separation of these particles from the reactant.

Nano particles are extremely reactive as the coordination of surface atoms in nano particle is incomplete, and can lead to particle agglomeration to minimize total surface or interfacial energy of the system. This problem is overcome by passivating the bare surface atoms with protecting groups. Capping or passivating the particle not only prevents agglomeration, it also protects the particles from its surrounding environment, and provides electronic stabilization to the surface. The capping agent usually takes the form of a Lewis base compound covalently bound to surface metal atoms.

Chemical techniques have therefore been developed to passivate or stabilize these nano particles. It is desirable that nano particles are protected from the environment but are still allowed to maintain their intrinsic properties. It has been shown that the size, morphology, stability and properties (chemical and physical) of these nanoparticles have strong dependence on the specificity of the preparation method and experimental conditions.

The stabilizing of nano particles in a sub micronic regime requires an agent that can bind to the cluster surface and thereby uncontrolled growth or agglomeration of the cluster or discrete particles into larger particles is prevented. The simplest method involves the use of a solvent that acts as a stabilizer of the small clusters. Unagglomerated nano particles can also be made by the use of polymeric surfactants ands stabilizers added to a reaction designed to precipitate a bulk material. The polymer attaches to the surface of the growing clusters and either by steric or electrostatic repulsion prevents further growth of the nano clusters. Commonly used chemical stabilizers include sodium polyphosphate and anionic agents such as thiolates.

Most capping reactions involve additional steps and the capping agents are generally toxic substances.

It is an object of the present invention to provide a stabilizing solution that successfully retains the intrinsic physical and chemical properties of the individual submicronic and particularly nano scale particles molecules.

Another object of this invention is to provide an inexpensive and environmental friendly process for manufacturing a stabilizing solution and to an efficient and 'green' process for the stabilizing of submicronic particles.

According to this invention therefore there is provided a sub micronic particle stabilizing solution comprising an aqueous extract of macerated biological cells having pH of 5.5 to 7.5, open circuit potential between +0.02 to +0.2 volt, temperature between 20 degrees to 30 degrees Celsius and concentration of total organic carbon being at least 18,000 ppm.

Typically, the biological cells are plant cells of plant tissue selected from a group of tissues comprising living tissue of leaves, fruits, stems, roots and flowers and parts thereof.

Alternatively, the biological cells are animal cells of animal tissue selected from a group of tissues consisting of tissues of worms, insects, fishes, mollusks, crustaceans, and higher animals.

Still alternatively, the cells are microbial cells selected from a group of microbes, which include bacteria, fungi, yeasts, viruses, protozoa and algae.

In accordance with another aspect of this invention there is provided a method of making a sub-micronic particle stabilizing solution which comprises the steps of {a} obtaining fresh biological tissue;

{b} macerating the biological tissue in water to form a suspension containing the extracts of the biological tissue;

{c} removing from the suspension suspended particles greater than one micron to obtain a clear concentrated extract;

{d} diluting the concentrated extract with deionized water in a ratio ranging from the original to 10 dilution;

{e} adjusting the temperature to 25 degrees Celsius;

(f) adjusting the pH of the diluted extract to between 5.5 to 7.5 pH;

{g} measuring the open circuit potential to ensure that that potential lies within the range of +0.02 to +0.2 volt; and {h} measuring the total organic carbon content to ensure that the content is at least 18,000 parts per million in solution.

The biological tissue is typically, macerated by at least one method from a group of macerating methods which consists of grinding, blending, milling, microwave treatment, ultrasonication, sonication, pounding, pressure extrusion, freezing-thawing, irradiation, heat treatment, osmolysis, enzymatic lysis, chemical lysis, vacuum lysis, and differential pressure lysis.

The removal of suspended particles is achieved by filtering the suspension through a sub micronic filter element.

In accordance with a preferable embodiment of the invention, the aqueous extract is treated with a non polar solvent, such as n-cyclohexane for beneficiation of the biomolecules in the extract.

In accordance with still another aspect of this invention there is provided a method of stabilizing sub micronic particles which comprises the steps of dispersing sub micronic particles in the stabilizing solution in accordance with this invention to obtain a resultant in which the concentration of the particles ranges from 5 to 300 ppm; and mixing the resultant for a period of 30 minutes to three hours to obtain a suspension of stabilized solid sub micronic particles.

In accordance with yet another aspect of this invention there is provided a method of stabilizing sub micronic metal particles, during their synthesis, which comprises the steps of dispersing salt of the metal in deionized water to form a solution; adding the formed solution to the stabilizing solution in accordance with this invention to obtain a resultant in which the concentration of the metal is in the range from 5 to 300 ppm and the effective dilution of the stabilizing solution is in the range of 1:1 to 1:10; adding a reducing agent to the resultant; and mixing the resultant for a period of 30 minutes to three hours to obtain a suspension of stabilized solid submicronic particles.

Typically, the sub micronic particles are particles selected from a group of particles from transition metals, alkali metals, alkaline earth metals, rare earth metals, metalloids, a combination of metals, metallic compounds and the sub micronic particles are nano particles and the stabilizing solution is added during the synthesis of the nano particles by a process from a group of process which includes a chemical process, a physical process and a biological process or after the synthesis.

In accordance with one embodiment of this invention the sub micronic particles are silver ions and the step includes dispersing a silver salt in deionized water having conductivity of less than 3 micro siemens.

In accordance with another embodiment of the invention, the sub micronic particles are gold ions and the step includes dispersing a gold salt in deionized water.

Typically, the reducing agent is at least one reducing agent selected from a group containing the stabilizing solution, citric acid, borohydride, sodium sulfide sodium acetate.

The theoretical considerations underlying the invention are as follows:

In nature, the chemical composition of cells across flora and fauna are remarkably similar. Thus living plants cells are very similar chemically to animal cells and microbial cells.

All cells contain biomolecules such as polysaccharides, proteins, lipids and nucleic acids which are made up of building blocks such as monosaccharides, amino acids, fatty acids, nucleotides. In addition many dynamically acting molecules such glutathione, cytochromes, ubiquinone, NADH, FADH, pyruvic acid, citric acid, maleic acids, glycerol are also present. These biomolecules have various reactive groups such as sulfhydryl, amino, imino, carboxyl, hydroxyl, and the like.

When living cells are macerated in water the biomolecules are released in the water. These biomolecules collectively contain all the reactive groups where the elements are in specific proportion to each other. It has been found that these biomolecules have the surprising collective ability to not only reduce metal ions such as gold and silver but also to act sterically on metal nano particles so as to stabilize them either in the process of their synthesis or in a post synthesis process. The binding interaction between biomolecules is relatively weak as compared with the interaction between these particles and typical chemical capping agents such thiols.

Metal nanoclusters are optically transparent and act as dipoles. Conduction and valence bands of metal nanoclusters lie closely and electron movement occurs quite freely. The potential applications of these systems are mainly associated with unusual dependence of the optical and electronic properties on the particle size. Silver particles having 5-50 nm sizes show a sharp absorption band in the 410-420 nm regions. While the same phenomenon with gold nano particles are observed at 520-550 nm.

The size of metal particles prepared by the method described in accordance with this invention depend on the concentration of the metal ions and concentration of biomolecules.

The synthesis of a particle, requires a two-step process, i.e., nucleation followed by successive growth of particles. In accordance with the present invention where the stabilization solution is added during the synthesis in the first step, part of metal ions in solution gets adsorbed on free nucleophilic groups (—SH, OH, $NH_2$) present on the surface of biomolecules in the stabilizing solution and get reduced. The reduced metal atoms thus created act as nucleation centers and facilitate further reduction of metal ions present in the bulk solution. The atomic coalescence leads to the formation of metal clusters and can be controlled by the natural ligands and surfactants forming part of biomolecular mass. Thus biomolecules act as both reducing as well as stabilizing agent. It has been found that a threshold concentration value of biomolecular mass is required to seed the process of submicronic formation and stabilization. This is expressed in terms of the total organic carbon content of the biomolecular mass.

It has also been found by experimentation that the reduction potential plays an important and crucial part in the formation and stabilization of nano particles, particularly, gold and silver nano particles. The electromotive force exhibited by 1 M concentration of a reducing agent and its oxidized form at 25° C. and pH 7.0 is called its standard reduction potential. It is a measure of the relative tendency of the reducing agent to lose electrons.

The reduction potential is measured in positive or negative volts on a scale in which the positive sign denotes a lower reduction potential than the negative sign. Therefore a substance with a standard reduction potential of +0.1 volt has a higher reduction potential than a substance with a standard reduction potential of +0.2 volts and therefore substance with a standard reduction potential of +0.1 volts will reduce the substance having a reduction potential of +0.2 volts. The standard reduction potentials of some of the biomolecules, such as NADH, ubiquinone, cytochrome $b_k$ are −0.32 Volt, −0.05 Volt and +0.03 Volt. On the other hand, the standard reduction potentials for conversion of ions such as gold and silver to their solid state are +1.5 Volt and +0.8 Volt, respectively. Thus the findings in accordance with this invention is that many biomolecules which have an effective standard reduction potential higher than that required for the conversion gold and silver ions to solid state particles, can effectively reduce these ions in solution. It is not possible to measure the standard reduction potential of the solutions formed in this invention because the molar concentrations of individual components of the biomolecular mass is unknown. However, dynamically the open circuit potential of the solution can be determined easily. At specific molar concentrations the open circuit potential has a direct relationship with the standard reduction potential. The open circuit potential indicates the initial empirical redox state of the solution.

For the process of our invention, it is critical that the stabilizing solution has an open circuit potential +0.02 to +0.2 Volt, a pH between 5.5 and 7.5 and temperatures between 20 to 30 degrees Celsius are also important parameters. The total organic carbon content of the stabilizing solution must also be at least 18,000 ppm. Purity of water having conductivity less than 3 micro siemens is also of significant importance in optimizing the process of particle formation. Concentration of metal ions in the reacting solution should lie between 5 to 300 ppm; metal ions in the mother solution being 150 to 60000 ppm.

It has been found in the course of experimentation that bio molecules normally found in plant cells, animal and microbial cells in the intact plant, animal or microbe have a reducing potential and are their reducing ability very slowly decreases when exposed to air under ambient conditions and rapidly to denaturing treatment. The reducing ability is therefore inversely related to the freshness of the tissue. It has also been found that the reducing ability varies from tissue to tissue and is inversely proportional to the duration of exposure to air eventually tending to zero.

Figure 1:
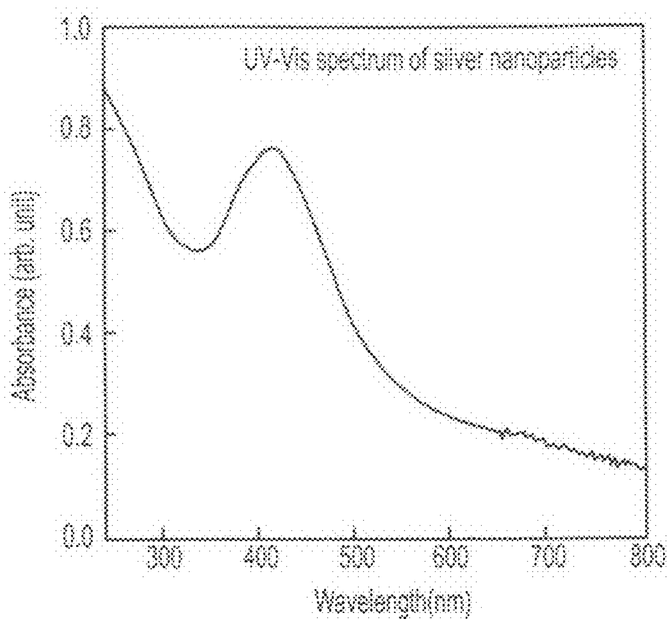
FIG. 1 is a graph of a colloidal suspension of Example 1 from 200 to 800 nm.

The invention will now be described with reference to the accompanying examples, which in no manner limit the ambit and scope of this invention.

EXAMPLE 1

Using Labconco, USA water pro system with pre-filter, carbon filter and reverse osmosis membrane water was collected. The said water had the conductivity of 2.7 microSiemens as measured by the online digital meter fitted in the instrument.

50 whole flowers of *Hibiscus rosasinensis* Linn (48.37 gm wet wt) were macerated with 150 ml of deionized water in a blender (500 rpm) for 10 minutes to get a homogenous viscous suspension. This viscous suspension was filtered through Whatman No 1 filter paper under vacuum to obtain a clear 165 ml of viscous solution. From this an aliquot of 10 ml was diluted upto 100 ml using water.

An aliquot of 7 ml were removed and checked for open circuit potential at 25° C. on Electrochemical analyzer (CH Instruments 600B, USA) using a three-electrode system. $Ag/AgCl_{(aq)}$ was used as reference electrode, Glassy carbon as working electrode (diameter 3 mm) and Pt wire (length 4 cm) as counter electrode. The value found was +0.15 Volt. Similarly pH of free flowing solution was checked using Digital pH meter (control Dynamics, India) and it was found to be 5.6.

The concentration of total organic carbon was measured using Beckman TOC analyzer and was found to be 22,180 ppm.

The synthesis of silver nanoparticle was carried out by Borohydride reduction method as described by Jin. R, Cao. Y. W., Kelly K. L., Schatz G. C., Zheng, J. G. and Chad A. Mirkin. (2001) Photoinduced conversion of silver nanospheres to nanoprisms. Science: 294; 1901-1903. Briefly, 10 ml of flower aqueous extract reacted with 100 μl of silver nitrate stock solution (100 mM) followed by addition of 100 μl of sodium borohydride (500 mM) which resulted in formation of a colloidal suspension.

Sample of colloidal suspension was scanned from 200-800 nm using Diode Array spectrophotometer (Ocean Optics, USA). A peak at 410 nm was detected. This peak was characteristic plasmon peak for silver nano particle [FIG. 1 of the accompanying drawings], typically having average diameter of 5-120 nm.

Figure 2:
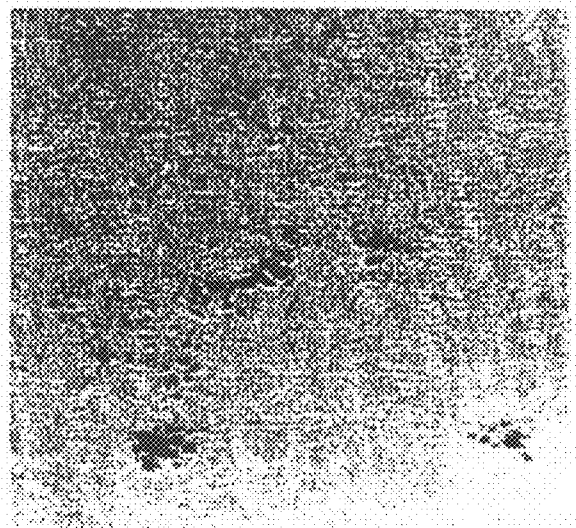
FIG. 2 is an atomic force microscopy of the Example 1 sample.

Another aliquot of colloidal suspension was examined by Transmission electron microscopy (TEM) at 200 kV using Philips electron microscope equipped with field emission gun, i.e., CM200 FEG. TEM specimen was prepared by pipetting 2 μL of colloid solution onto a carbon coated copper grid and image was obtained. The average size seen in image was 10-20 nm. [FIG. 2 of the accompanying drawings]

Figure 3A:
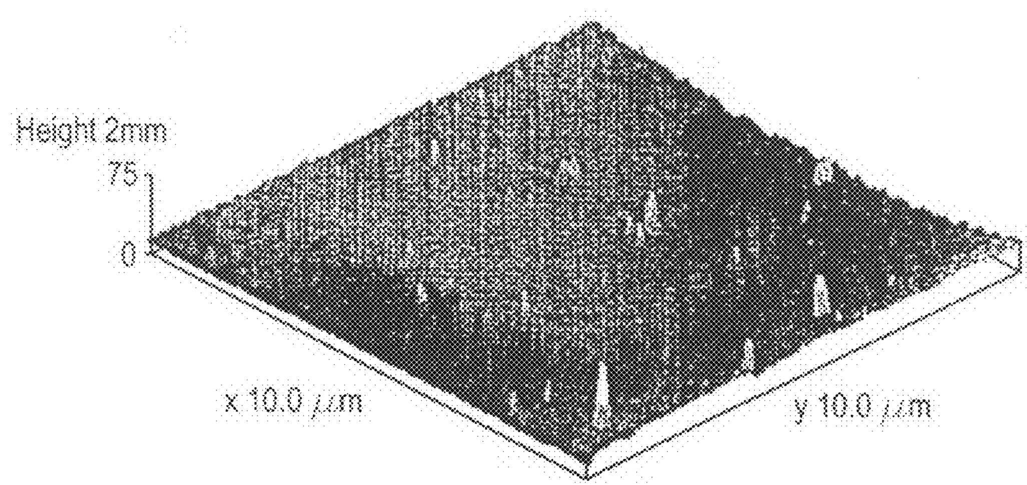
FIG. 3A is a 3-dimensional atomic force microscopy of the Example 1 sample and FIG. 3B is a two-dimensional atomic force microscopy of the said sample.
Figure 3B:
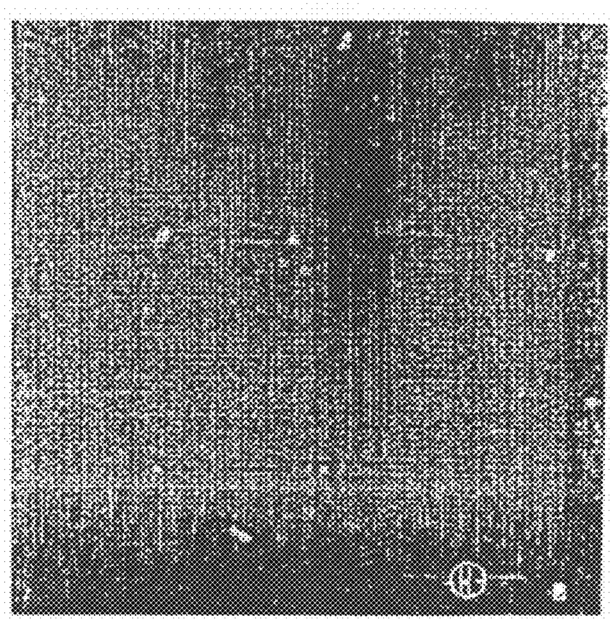

Atomic force microscopy (AFM) of the sample was performed using Nanonics MultiView 1000 AFM head with E scanner (Nanonics Imaging Ltd., Jerusalem, Israel). Sample was scanned in non-contact mode with a probe of 20 nm radius and a resonance frequency of 80 kHz. AFM images were captured, processed and analyzed with QUARTZ software, Version 1.00 (Cavendish Instruments Ltd., UK). For specimen, 5 μL of sample was placed on a 1-$cm^2$ glass slide (thickness 0.5 mm) and dried in laminar airflow before imaging. Uniform particles of 50-100 nm diameter and 125 nm height were observed as seen in FIG. 3*a* of the accompanying drawings which is the three dimension AFM view of a portion of the sample and 3*b* is a two dimensional view showing size analysis of a typical particle].

10 ml of colloidal suspension was kept at room temperature 27° C. for 90 days. At the end of 90 days spectral scan was carried out and microscopy with TEM and AFM was repeated. It was found that plasmon peak, particle size and shape remain substantially unchanged. Thus proving that there is no agglomeration of the nano particles.

Another 2 ml of solution was kept at 60° C. in a water bath for 30 minutes and no substantial change in plasmon peak, particle size and shape was observed indicating the stability of the nano particle suspension.

Similarly another 2 ml of nano particle suspension was frozen at −70° C. and then thawed at room temperature. After thawing the sample spectral scan was carried out and microscopy with TEM and AFM was repeated. It was found that plasmon peak, particle size and shape remain substantially unchanged. Thus proving that there is no agglomeration of the nano particles.

Yet another 2 ml of solution was freeze dried under vacuum using lyophilizer (Vertis Freezemobile 5EL, USA). The dried powder was resuspended in 2 ml deionized water and spectral scan was carried out and microscopy with TEM and AFM was repeated. It was found that plasmon peak, particle size and shape remain substantially unchanged. Thus proving that there is no agglomeration of the nano particles.

Another 2 ml of solution was centrifuged at 30,000 G for 30 min using ultracentrifugation (Optima Max centrifuge, Beckman Coulter, USA). The pellet was resuspended in 2 ml deionized water and spectral scan was carried out and microscopy with TEM and AFM was repeated. It was found that plasmon peak, particle size and shape remain substantially unchanged. Thus proving that there is no agglomeration of the nano particles.

Similarly 5 ml of nano particle suspension was buffered with citrate buffer of pH strength (3, 4, and 5) and phosphate buffer of pH strength (8, 9, 10) and kept for 30 min at the end of 30 min spectral scan was carried out and microscopy with TEM and AFM was repeated. It was found that plasmon peak, particle size and shape remain substantially unchanged. Thus proving that there is no agglomeration of the nano particles.

In 5 ml of nanoparticle suspension sodium chloride was added to achieve final concentration of 10 mM to 50 mM after 30 min of addition spectral scan was carried out and microscopy with TEM and AFM was repeated. It was found that plasmon peak, particle size and shape remain substantially unchanged. Thus proving that there is no agglomeration of the nano particles.

The above tests show that the silver nano particles are stable under normal and moderately harsh environmental conditions in presence of flower extract.

EXAMPLE 2

The water having conductivity of 2.7 microSiemens was used in the experiment and the experiment was carried out at 27 degrees celsius.

The leaves of *Asparagus racemosus* (47.00 gm wet wt) were macerated with 150 ml of water as described in example 1 and filtered through Whatman No 1 filter paper under vacuum to obtain a clear 155 ml of solution. From this stock an aliquot of 10 ml was diluted upto 100 ml with deionized water and mixed thoroughly by shaking. The open circuit potential and pH were measured as described in example 1 and found to be +0.09 Volts and 6.0 respectively. The concentration of total organic carbon was measured using Beckman TOC analyzer and was found to be 23,480 ppm.

Figure 4:
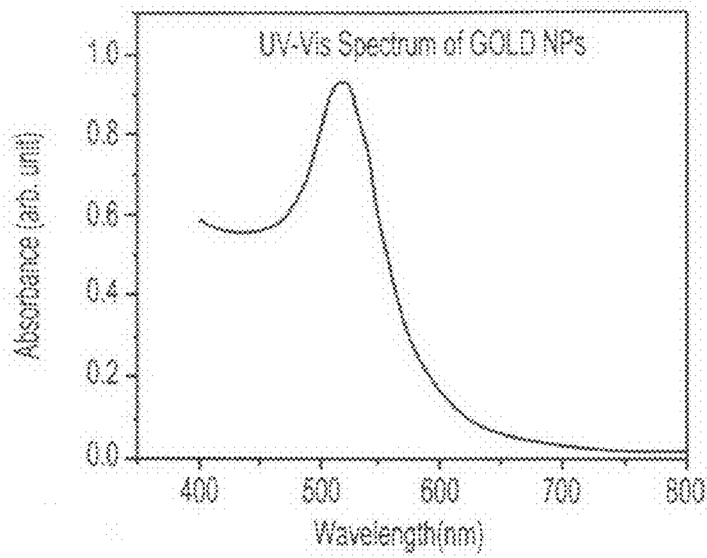
Figure 5:
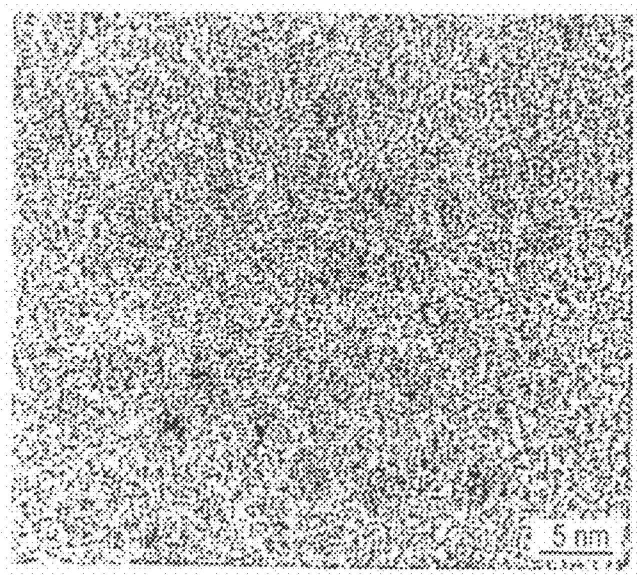
Figure 6A:
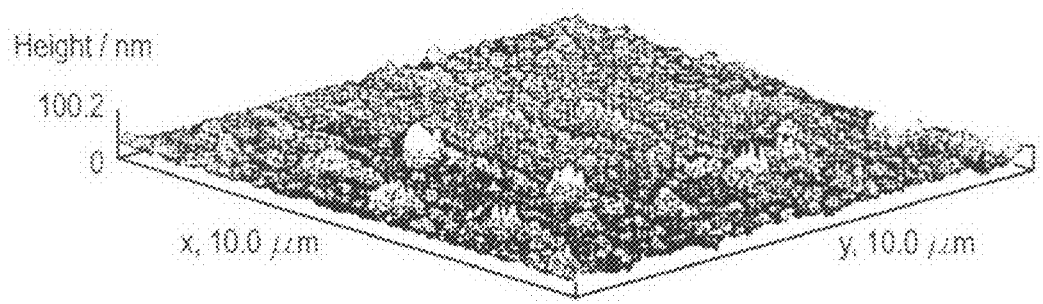
Figure 6B:
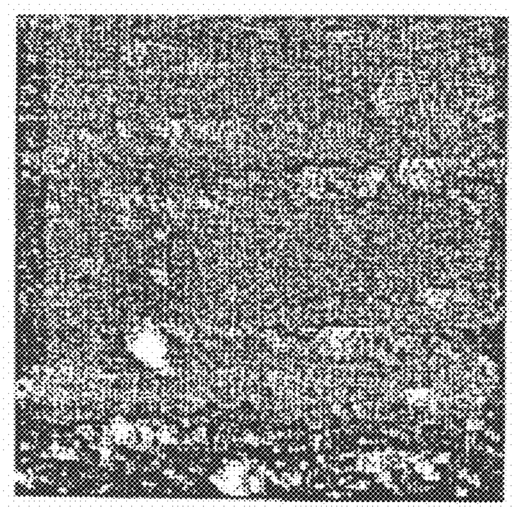

The synthesis of gold submicronic particles was carried out by the citrate reduction method as described in J Turkevitch, P. C Stevenson and J Hillier, (1951). Nucleation and Growth Process in the Synthesis of Colloidal Gold. *Discuss. Faraday Soc.,* 11, 55-75. Briefly, 10 ml leaf extract was reacted with 200 μl of tri-sodium citrate solution (1%) followed by addition of 25 μl of chloroauric acid (25 mM). Samples were drawn and checked for various parameters as described in example 1. Characteristic plasmon peak of nano gold particles at 540 nm was observed indicating an average diameter in the range of 20-150 nm. [FIG. 4 of the accompanying drawings]. The TEM and AFM studies (FIGS. 5 and 6 of the accompanying drawings confirmed nano scale submicronic particles and average diameter was found to be 30 nm. The stability of nano particles was checked in detail as described in example 1 and it was observed that the gold nano particles are stable under normal and moderately harsh environmental conditions.

EXAMPLE 3

Water having conductivity of 2.7 microSiemens was used in the experiment.

Fruiting body of fungus *Itajahia* sp. (45 wet wt) was macerated in 150 ml of water in example 1 and filtered through Whatman No 1 filter paper under vacuum to obtain a clear 165 ml of solution From this stock an aliquot of 10 ml was diluted up to 100 ml with deionized water and mixed thoroughly by shaking The open circuit potential and pH was measured as described in example 1 and found to be +0.11 Volts and 6.0 respectively. The concentration of total organic carbon was measured using Beckman TOC analyzer and was found to be 26,800 ppm.

The synthesis of FeS nano particles was carried out by solid phase synthesis using sodium sulphide as reducing agent as described W X Zhang, C B wang and H I Lien, (1998) Treatment of chlorinated organic contaminants with nanoscale bimetallic particles. *Catalysis Today.* 47; 387-395. Briefly, in 10 ml of extract $FeSO_4$ (0.25 M) was added followed by addition of sodium sulphide (0.25 M) and stirred vigorously under nitrogen atmosphere. To this mixture $Na_2S$ (1 M, 5 ml) was added dropwise to get a black colloidal suspension of FeS. The colloidal suspension was centrifuged at 8000×g for 30 minutes at 25° C. and particles were separated after decanting the supernatant. They were washed several times with $N_2$ purged deionized water to remove the unreacted components. After drying under vacuum they stored at room temperature in clean vials. Samples were drawn and checked for various parameters as described in example 1. The TEM and AFM studies confirmed submicronic particles and average diameter was found to be 250 nm. The stability was checked in detail as described in example 1 and it was observed that the particles were stable under normal and moderately harsh environmental conditions. The FeS particles retained their black color at ambient temperature indicating the particle stability.

EXAMPLE 4

Water having conductivity of 2.7 microSiemens was used in experiment.

In yet another example flowers of *Nyctanthes arbor-tristis* (common name; harsingar 53.00 gm wet wt) were macerated with 150 ml of deionized water as described in example 1. The suspension was filtered through Whatman No 1 filter paper under vacuum to obtain a clear 170 ml of solution. From this stock an aliquot of 10 ml was diluted upto 100 ml with deionized water and mixed thoroughly by shaking. The open circuit potential and pH was measured as described in example 1 and found to be +0.120 Volts and 5.8 respectively The concentration of total organic carbon was measured using Beckman TOC analyzer and was found to be 20,190 ppm.

The synthesis of copper nanoparticles in solution was carried out by photo-reduction method as described in S Kapoor and T Mukherjee, (2003) Photochemical formation of copper nanoparticles in poly(N-vinylpyrrolidone). *Chemical Physics Letters* 370; 83-87. Briefly, 10 ml of flower extract was reacted with $1\times10^{-4}$ M $CuSO_4$ under the set of conditions as described. The resulting colloidal suspension showed characteristic plasmon band of copper at 565 nm indicating an average size in range of 10-50 nm. The colloidal suspension was found to stable for 21 days at room temperature.

EXAMPLE 5

Water having conductivity of 2.7 microSiemens was used in experiment.

Whole leaves of *Aloe-vera* (55.37 gm wet wt) were washed, peeled and macerated with 150 ml of deionized water in a blender (500 rpm) for 10 minutes to get a homogenous viscous suspension. This viscous suspension was filtered through Whatman No 1 filter paper under vacuum to obtain a clear 165 ml of viscous solution. From this stock an aliquot of 10 ml was diluted upto 100 ml by water and mixed thoroughly by shaking to get a free flowing solution. The open circuit potential and pH was measured as described in example 1 and found to be +0.08 Volts and 6.8 respectively. The concentration of total organic carbon was measured using Beckman TOC analyzer and was found to be 29,300 ppm.

Synthesis of bismuth nano particles via microemulsion method was carried out as described in J. Fang, K L Stokes, J A wienmann, W L Zhou, (2000). Nanocrystalline bismuth synthesized via an in situ polymerization-microemulsion process. *Materials Letters* 42: 113-120. Briefly, 10 ml solution of *aloe-vera* extract was reacted with 0.03 M solution of bismuth nitrate solution followed by the addition of 0.15 M sodium borohydride, rest of the conditions were maintained. The resulting colloidal suspension has shown characteristic plasmon band of bismuth at 268 nm indicating an average size in range of 10-100 nm. The colloidal suspension was found to stable for 21 days at room temperature

EXAMPLE 6

The water having conductivity of 2.7 microSiemens was used in experiment.

Ripe fruits of *Azadirachta indica* (53.00 gm wet wt) were macerated with 150 ml of deionized water as described in example 1 and seeds was removed. The mucilaginous suspension was filtered through Whatman No 1 filter paper under vacuum to obtain a clear 170 ml of solution. From this stock an aliquot of 10 ml was diluted upto 100 ml with deionized water and mixed thoroughly by shaking. The open circuit potential and pH was measured as described in example 1 and found to be +0.110 Volts and 6.2 respectively. The concentration of total organic carbon was measured using Beckman TOC analyzer and was found to be 25,400 ppm.

Figure 7:
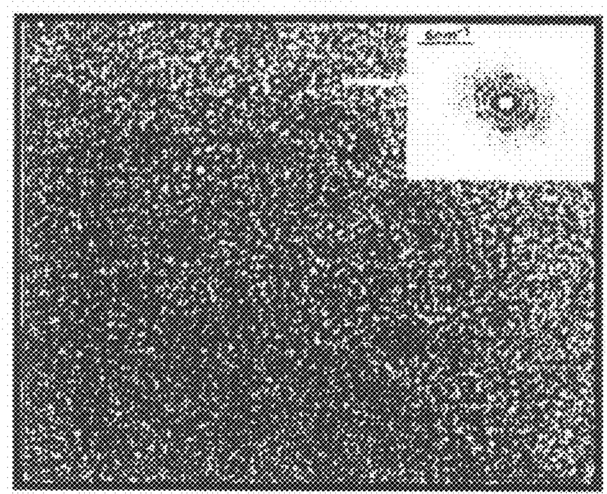

The synthesis of CdS nano particles was carried out by solid-state reaction as described in W Wang, Z liu, C Zheng, C Xu Y Liu, G Wang, (2003). Synthesis of CdS nano particles by a novel and simple one-step, solid-state reaction in the presence of a nonionic surfactant. *Materials Letters* 57; 2755-2760. Typically, 5.8 gm of cadmium chloride and 6.144 gm of sodium sulphide was ground in presence of 10 ml of the fruit extract. The resulting suspension was centrifuged at 8000-x G for 30 minutes at 25° C. and particles were separated after decanting the supernatant. They were washed several times with deionized water to remove the unreacted components and pellet was dissolved in water. The resulting colloidal suspension has shown characteristic plasmon band of CdS at 468 nm indicating an average size in range of 5-10 nm as seen in the TEM picture [FIG. 7 of the accompanying drawings]. The colloidal suspension was found to stable for 60 days at room temperature.

EXAMPLE 7

Water having conductivity of 2.7 microSiemens was used in experiment.

Leaves of *Eucalyptus camaldulensis* (54 gm wet wt) were macerated with 150 ml of deionized water as described in example 1. The suspension was filtered through Whatman No 1 filter paper under vacuum to obtain a clear 157 ml of solution. The open circuit potential and pH was measured as described in example 1 and found to be +0.07 Volts and 6.2 respectively. The concentration of total organic carbon was measured using Beckman TOC analyzer and was found to be 23,180 ppm.

The synthesis of nanocrystalline $CeO_2$ was carried out by microwave irradiation as described in X H Liao, J Zhu, J J Zhu, J Z Xu, and H Y Chen, (2001) Preparation of monodispersed nanocrystalline CeO2 powders by microwave irradiation. *Chem. Commun.*, 937-938. Typically, 1 wt % PEG, 0.01 mol $L^{-1}$ $(NH4)_2$-$Ce(NO_3)_6$, 1 wt % sodium acetate and 1% extract was exposed to microwave radiation at a power level of 30% (the microwave operating in a 30 second cycles, on for 9 s, and off for 21 s at a total power of 650 W for 10 min), and then cooled to room temperature The resulting precipitate was centrifuged, washed with distilled water and dried in air. The final yellow product was collected for characterization. Particles in size range of 10-20 nm were observed by TEM and rechecked for stability after 90 days.

EXAMPLE 8

Water having conductivity of 2.7 microSiemens was used in experiment.

Roots of *Withania somifera* (common name Ashwagandha; 50 gm wet wt) was macerated with 150 ml of deionized water as described in example 1. The suspension was filtered through Whatman No 1 filter paper under vacuum to obtain a clear 157 ml of solution. From this stock an aliquot of 10 ml was diluted upto 100 ml with deionized water and mixed thoroughly by shaking. The open circuit potential and pH was measured as described in example 1 and found to be +0.07 Volts and 6.2 respectively. The concentration of total organic carbon was measured using Beckman TOC analyzer and was found to be 24,300 ppm.

Figure 8:
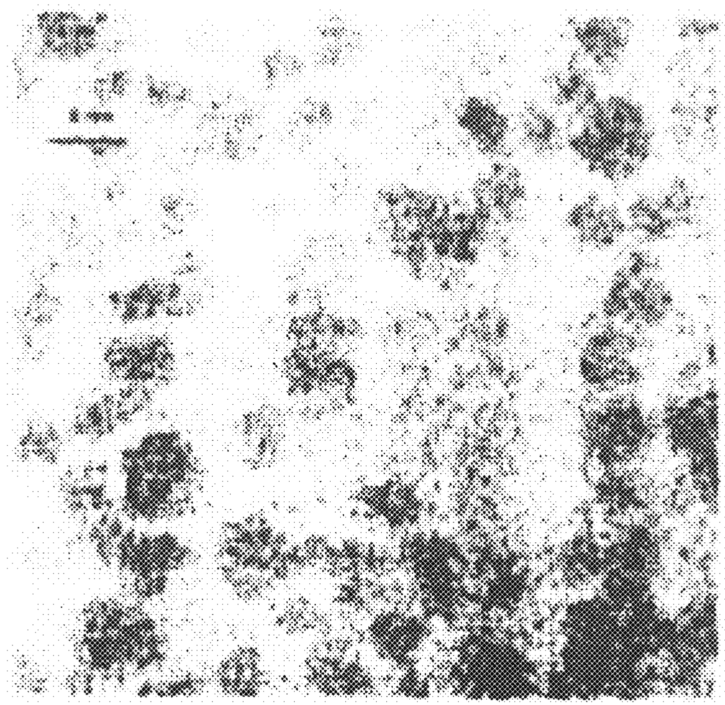

The synthesis of PbS nano particles was carried out by sulfur reduction under heating conditions as described Jin Joo, Hyon Bin Na, Taekyung Yu, Jung Ho Yu, Young Woon Kim, Fanxin Wu, Jin Z. Zhang, and Taeghwan Hyeon, (2003) Generalized and Facile Synthesis of Semiconducting metal Sulfide Nanocrystals. *J. AM. CHEM. SOC.* 2003, 125, 11100-11105. Typically, 10 ml of extract was reacted with $PbCl_2$ (0.28 gm) in presence of sulphur (27 mg). The particle size was found to be in the range of 5-10 nm as seen in FIG. 8 of the accompanying drawings. After 90 days the TEM image were found to be unchanged.

EXAMPLE 9

Water having conductivity of 2.7 microSiemens was used in experiment.

Leaves of *Eucalyptus camaldulensis* (54 gm wet wt) were macerated with 150 ml of deionized water as described in example 1. The suspension was filtered through Whatman No 1 filter paper under vacuum to obtain a clear 157 ml of solution. The open circuit potential and pH was measured as described in example 1 and found to be +0.07 Volts and 6.2 respectively. The concentration of total organic carbon was measured using Beckman TOC analyzer and was found to be 22,150 ppm.

The synthesis of ZnS nano particles was carried out by sulfur reduction under heating conditions as described in Jin Joo, Hyon Bin Na, Taekyung Yu, Jung Ho Yu, Young Woon Kim, Fanxin Wu, Jin Z. Zhang, and Taeghwan Hyeon, (2003) Generalized and Facile Synthesis of Semiconducting metal Sulfide Nanocrystals. *J. AM. CHEM. SOC.* 2003, 125, 11100-11105. Typically, 10 ml of extract was reacted with $ZnCl_2$ (2 mM) in presence of sulphur (6 mM). The particle size was found to be in the range of 10-30 nm. The particles were found to be fluorescent when excited with UV radiation which remained unchanged after 30 days.

EXAMPLE 10

Water having conductivity of 2.7 microSiemens was used in experiment.

5 whole leaves of *Aloe-vera* (55.37 gm wet wt) were washed, peeled and macerated with 150 ml of deionized water in a blender (500 rpm) for 10 minutes to get a homogenous viscous suspension. This viscous suspension was filtered through Whatman No 1 filter paper under vacuum to obtain a clear 165 ml of viscous solution. From this stock an aliquot of 10 ml was diluted upto 100 ml with deionized water and mixed thoroughly by shaking to gel a free flowing solution. The open circuit potential and pH was measured as described in example 1 and found to be +0.07 Volts and 6.8 respectively. The concentration of total organic carbon was measured using Beckman TOC analyzer and was found to be 24,200 ppm.

The synthesis of MnS nano particles was carried out by sulfur reduction under heating conditions as described in Jin Joo, Hyon Bin Na, Taekyung Yu, Jung Ho Yu, Young Woon Kim, Fanxin Wu, Jin Z. Zhang, and Taeghwan Hyeon, (2003) Generalized and Facile Synthesis of Semiconducting metal Sulfide Nanocrystals. *J. AM. CHEM. SOC.* 2003, 125, 11100-11105. Typically, 10 ml of extract was reacted with $MnCl_2$ (2 mM) in presence of sulphur (2 mM). The particle size was found to be in the range of 20-80 nm.

EXAMPLE 11

49 gm of *Argyeria speciosa*_leaves (7 in no) were macerated in a blender, in distilled water; the final volume was made up to 150 ml. This extract was filtered through muslin cloth and further centrifuged at 5000 rpm for 5 min to remove suspended materials before use. The open circuit potential and pH was measured as described in example 1 and found to be +0.05 Volts and 6.8 respectively. The concentration of total organic carbon was measured using Beckman TOC analyzer and was found to be 30,200 ppm.

Synthesized gold and silver nano particles synthesized by the citrate method and the borohydrate reduction method respectively were suspended in 10 ml leaf extract. The resultant solution was mixed thoroughly for one hour. Samples were drawn and checked for various parameters as described in example 1. Characteristic plasmon peak for gold at 540 nm indicated average diameter of the particle in the range 20 to 150 nm. For silver similar peaks were observed at 410 nm and the TEM picture showed nano particles in the size range of 50 120 nm. After 90 days the stability remained unchanged.

EXAMPLE 12

Bitter gourd (20 gm) was soaked in water, blended in mixer, and diluted with 150 ml of distilled water. Extract was obtained by pressing the pulp from muslin cloth. Prior to execution of the experiment, the extracts were filtered with Whatman No 1 filter paper and stored at 4° C. The open circuit potential and pH was measured as described in example 1 and found to be +0.07 Volt and 6.9 respectively. The concentration of total organic carbon was measured using Beckman TOC analyzer and was found to be 24,200 ppm.

Synthesis of gold and silver nano particles was effected by adding minute quantities of silver nitrate and gold chloride stock solutions [concentration 50,000 ppm and 25,000 ppm respectively] to 10 ml of the bitter gourd extract diluted 5 fold. The resultant solution was mixed thoroughly for three hours. The color of the solution changed from color less to reddish yellow in case of silver and from golden yellow to pink in case of gold after incubation for 3 hours. Characteristic plasmon peak for gold at 550 nm indicated average diameter of the particle in the range 20 to 150 nm. For silver similar peaks were observed at 420 nm and the TEM picture showed nano particles in the size range of 50 to 120 nm. After 90 days the stability remained unchanged.

EXAMPLE 13

50 gms of live earth worms [*Lumbricus terristris]* were ground in a mortar pestle and 150 ml deionized water until a homogenous viscous suspension was formed. The viscous solution was filtered through Whatman no 1 filter paper under vacuum to obtain a clear solution. This solution was diluted 10 fold and the open circuit potential and pH was measured as described in example 1 and found to be +0.18 Volt and 7 respectively. The concentration of total organic carbon was measured using Beckman TOC analyzer and was found to be 32,200 ppm.

Synthesis of gold and silver nano particles was effected by adding minute quantities of silver nitrate and gold chloride stock solutions [concentration 50,000 ppm and 25,000 ppm respectively] to 10 ml of the aqueous extract. The resultant solution was mixed thoroughly for one hour. Samples were drawn and checked for various parameters as described in example 1. Characteristic plasmon peak of silver nano particles at 410 nm and for gold nano particles at 530 was observed. TEM image of silver nano particles also confirms the formation particles in the range of 10-50 nm for silver and 30 to 80 for gold.

EXAMPLE 14

50 gms of fresh fish [pomfret—*Pampus argentus]* was ground in a tissue homogenizer and mixed with 150 ml deionized water until a homogenous viscous suspension was formed. The viscous solution was filtered through Whatman no 1 filter paper under vacuum to obtain a clear solution. This solution was diluted 10 fold and the open circuit potential and pH was measured as described in example 1 and found to be +0.09 Volt and 7.2 respectively. The concentration of total organic carbon was measured using Beckman TOC analyzer and was found to be 34,200 ppm.

Synthesis of gold and silver nano particles was effected by adding minute quantities of silver nitrate and gold chloride stock solutions [concentration 50,000 ppm and 25,000 ppm respectively] to 10 ml of the aqueous extract. The resultant solution was mixed thoroughly for one hour. Samples were drawn and checked for various parameters as described in example 1.

Characteristic plasmon peak of silver nanoparticles at 410 nm and for gold nano particles at 530 was observed. TEM image of silver nano particles also confirms the formation particles in the range of 10-50 nm for silver and 30 to 80 for gold.

EXAMPLE 15

50 gms of freshly harvested culture in pellet form of *Escherichia coli* was sonicated in deionized water for 15 minutes the resultant suspension was centrifuged at 8000 G and the clear supernatant was diluted 10 fold and the open circuit potential and pH was measured as described in example 1 and found to be +0.1 Volt and 6.7 respectively. The concentration of total organic carbon was measured using Beckman TOC analyzer and was found to be 24,000 ppm.

Synthesis of gold and silver nano particles was effected by adding minute quantities of silver nitrate and gold chloride stock solutions [concentration 50,000 ppm and 25,000 ppm respectively] to 10 ml of the aqueous extract. The resultant solution was mixed thoroughly for one hour. Samples were drawn and checked for various parameters as described in example 1. characteristic plasmon peak of silver nanoparticles at 420 nm and for gold nano particles at 550 was observed. TEM image of silver nano particles also confirms the formation particles in the range of 10-50 nm for silver and 30 to 80 for gold.

EXAMPLE 16

Water having conductivity of 2.7 microSiemens was used in experiment.

5 whole leaves of *Aloe-vera* (55.37 gm wet wt) were washed, peeled and macerated with 150 ml of deionized water in a blender (500 rpm) for 10 minutes to get a homogenous viscous suspension. This viscous suspension was filtered through Whatman No 1 filter paper under vacuum to obtain a clear 165 ml of viscous solution. To this solution 50 ml of n-cyclohexane was added and the resultant was thoroughly shaken in a separating funnel. The cyclohexane extract was separated and the contents were re-extracted in 150 ml of deionized water. From this stock an aliquot of 10 ml was diluted to 200 ml with deionized water and mixed thoroughly by shaking to get a free flowing solution. The open circuit potential and pH was measured as described in example 1 and found to be +0.11 Volts and 6.8 respectively. The concentration of total organic carbon was measured using Beckman TOC analyzer and was found to be 19,200 ppm.

Synthesis of gold and silver nano particles was effected by adding minute quantities of silver nitrate and gold chloride stock solutions [concentration 50,000 ppm and 25,000 ppm respectively] to 10 ml of the aqueous extract. The resultant solution was mixed thoroughly for one hour. Samples were drawn and checked for various parameters as described in example 1. Characteristic plasmon peak of silver nano particles at 420 nm and for gold nano particles at 550 was observed. TEM image of silver nano particles also confirms the formation particles in the range of 20-40 nm for silver and 5 to 10 for gold.

All the above examples were carried out at a temperature around 25 degrees Celsius.

The examples show that the aqueous extracts of macerated cells of biological tissue are excellent agents for stabilization of submicronic particles. Additionally, they are an eco friendly reducing agent in the synthesis of gold and silver sub micronic particles.

I claim:

1. A sub micronic particle stabilizing solution comprising an aqueous extract of macerated biological cells having pH of 5.5 to 7.5, open circuit potential between +0.02 to +0.2 volt, temperature between 20 degrees to 30 degrees Celsius and concentration of total organic carbon being at least 18,000 ppm.

2. A sub micronic particle stabilizing solution as claimed in claim 1, in which the biological cells are plant cells.

3. A sub micronic particle stabilizing solution as claimed in claim 1, in which the biological cells are cells of at least one plant tissue selected from a group of tissues comprising living tissue of leaves, fruits, stems, roots and flowers and parts thereof.

4. A sub micronic particle stabilizing solution as claimed in claim 1, in which the biological cells are animal cells.

5. A sub micronic particle stabilizing solution as claimed in claim 1, in which the biological cells are cells of at least one animal tissue selected from a group of tissues consisting of tissues of worms, insects, fishes, mollusks, crustaceans, and higher animals.

6. A sub micronic particle stabilizing solution as claimed in claim 1, in which the cells are microbial cells.

7. A sub micronic particle stabilizing solution as claimed in claim 1, in which the cells are selected from a group of microbes which include bacteria, fungi, yeasts, viruses, protozoa and algae.

* * * * *